US006984283B1

(12) United States Patent
Noriega

(10) Patent No.: US 6,984,283 B1
(45) Date of Patent: Jan. 10, 2006

(54) METHOD OF MAKING IMAGE BEARING LAMINATED DOOR/WINDOW SCREEN WITH CHANGEABLE IMAGES

(76) Inventor: Linda Y Noriega, 10420 Denton Creek Dr., Fenton, MI (US) 48430

( * ) Notice: Subject to any disclaimer, the term of this patent is extended or adjusted under 35 U.S.C. 154(b) by 0 days.

(21) Appl. No.: 10/937,541

(22) Filed: Sep. 9, 2004

(51) Int. Cl.
*B32B 31/00* (2006.01)
*B32B 35/00* (2006.01)

(52) U.S. Cl. ...................... 156/256; 156/152; 156/265; 156/344; 40/594; 40/615

(58) Field of Classification Search ................ 156/152, 156/250, 256, 264, 265, 344, 584; 40/594, 40/615
See application file for complete search history.

(56) References Cited

U.S. PATENT DOCUMENTS 1,805,327 A * 5/1931 Carr ............................ 40/615
1,975,579 A 10/1934 Kernes
2,240,072 A 4/1941 Hodgdon et al.
2,306,387 A * 12/1942 Huntley ....................... 40/615
2,624,967 A * 1/1953 Phillippi ...................... 40/615
2,847,779 A * 8/1958 Hill ............................ 40/584
3,725,184 A 4/1973 Scopp
4,242,823 A * 1/1981 Bruno ......................... 40/621
4,642,257 A * 2/1987 Chase ......................... 428/63
4,673,609 A 6/1987 Hill
4,707,391 A * 11/1987 Hoffmann, Sr. ............. 428/63
4,907,636 A 3/1990 Simon
4,940,622 A * 7/1990 Leavitt et al. ............. 428/137
5,191,748 A 3/1993 Baughman
5,525,177 A 6/1996 Ross
5,545,446 A 8/1996 Looi et al.
5,620,768 A * 4/1997 Hoffmann, Sr. ............. 428/77
5,682,939 A 11/1997 Vargo
5,728,632 A 3/1998 Sugie
5,785,792 A * 7/1998 Locke et al. ................ 156/247
5,997,982 A * 12/1999 Susat ......................... 428/100
6,096,409 A 8/2000 McLaughlin
RE37,186 E 5/2001 Hill

* cited by examiner

*Primary Examiner*—Mark A. Osele
(74) *Attorney, Agent, or Firm*—VanOphem & VanOphem, P.C.

(57) ABSTRACT

There is disclosed a method of constructing a laminated composite bidirectional panel from commercially available transparent/see-through materials, which may be used as shades for openings, such as doors and windows, to advance an aesthetically pleasing appearance in which, changeable decorative images of varying configurations and colors are incorporated between layers of laminations to promote the mood of a particular season, occasion, or event.

9 Claims, 5 Drawing Sheets

METHOD OF MAKING IMAGE BEARING LAMINATED DOOR/WINDOW SCREEN WITH CHANGEABLE IMAGES

CROSS REFERENCE TO RELATED APPLICATION

Not Applicable

FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention generally relates to laminated image bearing composite panels, which are primarily used to offer an aesthetically pleasing appearance, and in particular to decorative image bearing panels to be used in door/window/opening screens.

2. Description of Related Art

Numerous devices and procedures have been available for laminating decorative images between layers of panels, which form an object to either enhance the overall aesthetics of a particular environment or make use of in some form, shape, or fashion in our daily activities. Since the pleasant looks of such laminated decorative images tend to advance a special aesthetic decorative appeal to most users, the needs and attempts to make advancement in the art are persistently growing among the artisans and enthusiast who are keenly associated with the art. For the most part, thin transparent flexible materials, in the form of flat panels, have been in use in the process of lamination in embedding decorative images therebetween. In the early days, curtains, wall hangings, and articles of clothing were among the subjects for incorporating decorative images in enhancing their respective aesthetic appearances. In recent years, with the advent of more modern, flexible, durable, and transparent materials, the art of incorporating decorative images between transparent layers of such materials has helped create numerous everyday articles of manufactures that we use on a regular basis. The term transparent panel as used in the art includes a sheet of transparent material, a laminate of transparent materials or as an assembly of transparent materials, such as glass or plastics, for example, acrylic sheets or polycarbonate sheets and including flexible materials such as a polyester film or polyvinyl chloride film. Similarly, the term translucent panel includes sheets of translucent materials, a laminate of translucent materials such as glass or plastics, for example acrylic sheets, including flexible materials such as polyester film, paper, fabric or other material.

Although, the primary purpose of placing images between layers of transparent flat sheet material was to advance an aesthetic appearance of an article of practical use or artistic expression, the secondary purposes have also evolved with the availability of a great variety of such laminated images. One of such secondary purposes is to protect much-cherished valuable pieces of images from physical damage from the adverse effect of climatic changes. One area of the application of such lamination of images is flexible display images. One of the currently used and accessible method of producing display images is known as the Cromalin (registered trademark) color display system offered by DuPont Company. The Cromalin color display system produced full color displays on a number of possible flat laminated surfaces. Furthermore, it is well known to use plastic sheets to form shower cabinets, one or more of such sheets forming access doors, which are mounted for slidable movement along guide tracks between open and closed positions. According to one method of manufacturing laminated bath door panels there is provided a transparent or translucent panel for mounting along one or more edges of a bath or shower tray, in which the panel consists of a laminate of two layers of resin-impregnated fiberglass, which are transparent or translucent, and a non-woven decorative tissue arranged between the layers. By virtue of the incorporation of the decorative material within the whole of the panel structure during its manufacture, the decorative material is protected from contact with water and water vapor, whereby the visual presentation of the decorative material is maintained without adverse effects or deterioration over time due to the presence of the moisture in the environment.

The incorporation of an opaque pattern on or into particular types of transparent panels in order to create unidirectional vision is already known in the construction of transparent walled squash courts. Detailed delineation of typical approaches to incorporating decorative images into layers of flexible sheets or webs may be found in a number of U.S. patents. One of such teachings of image transfer method for display panel may be found in U.S. Pat. No. 5,525,177 to Ross. In the Ross patent, the method produces an image onto a surface of a one-way vision display panel of the type which is constructed as a perforated membrane having an opaque light reflective surface and a light-absorbing surface and whereby the image is clearly visible when viewing the display panel from one direction and wherein the perforated membrane permits substantially unobstructed through viewing when viewing the display panel from a second, opposite direction.

Another example of an image transfer method is detailed in the U.S. Pat. No. 2,240,072 to Hodgdon et al. Here between a pair of transparent outer layers, a layer of adhesive is embedded, which is not as transparent as the outer layers. When the adhesive is still soft, images are physically impressed upon it to produce varying thicknesses. These varying thicknesses produce variable transparency such that the simple designs and letters become visible when the laminated article is held against a light.

U.S. Pat. No. 1,975,579 to Kernes provides an early description of a process that includes incorporation of pictures, designs, illustrations, and prints between multiple layers of tissue papers to form an overall composite material.

The teachings of U.S. Pat. No. 5,545,446 to Looi et al. provides an illustration of a large body of art wherein transparent or translucent layers are constructed over inner layers, which bear various decorative images, generally for the purpose of providing physical or waterproofing protection to the image while providing a pleasingly aesthetically looking article formed from the composite, which is visible apparently regardless of the ambient lighting environment.

Another example is U.S. Pat. No. 6,096,409 to McLaughlin reveals an image bearing composite optical material. The image bearing composite is formed as a laminated flexible sheet having an image bearing photographic quality film layer variously bonded between outer and inner translucent layers of paper, fabric, or synthetic materials. The invention provides two sharply distinct appearances. One appearance is visible under a backlit illumination, and the other is visible under an ambient illumination condition.

We have seen in the aforementioned prior art many applications of incorporation of decorative images between layers of transparent or translucent material to enhance aesthetic appearance of an article of manufacture or to protect embedded decorative images itself from adverse effects of heat, moisture, and vapors of the environment. Though the search is not exhaustive, the application of the art of incorporating decorative images in an article of manufacture, such as door or window screen, without interfering with the functional use thereof has not been found in any reference. Further, the ability to easily change the desired aesthetic effects without significant cost effects is also not found in the prior art. The lack of flexibility of replacing the embedded images, to offer a new or variety look, necessarily forces a user to opt for multiple pieces of such article. It is true that, the frequent replacements of such embedded layers/images are not generally warranted to achieve structural stability of a particular laminated article of manufacture. Moreover, one of the purposes of embedding such images is to permanently protect such images from the adverse effects of the changes of the climate. Nonetheless, the option of replacing embedded images from between layers of see-through material affords a user the opportunity to offer a viewer a variety of aesthetic appearance that is commensurate with the specific mood of a particular occasion, season, or for that matter any event at a low cost. Stated differently, a variety of decorative images for a door/window screen offers a variety of aesthetically pleasing appearances to a variety of viewers. Also to the user, it brings a new look, and hence a new mood, at every time he/she changes the images of a door/window screen panel. This flexibility of replacing decorative images in a door/window screen panel offers, as many options of appearances as one can imagine since, the availability of the variety of images are countless. Most of the applications of incorporating decorative images between layers of a composite in the art have been directed to permanently embedding or sandwiching such images therebetween.

Consequently, what is needed is a method or process of transferring and embedding decorative images between layers of see-through material to form a laminated composite, which can be used, in addition to its intended purpose of allowing air to pass therethrough, to offer an aesthetically pleasing appearance, that is visible from both sides thereof. The method or process should also be capable of offering an option for replacing such decorative images at will, to create a variety of different and new aesthetically pleasing appearances depending upon the occasion, season, or for that matter any event.

BRIEF SUMMARY OF THE INVENTION

According to the present invention, there is provided an image bearing previously see-through panel for using as a door/window/opening screen to form a barrier to protect against the elements of nature, such as insects and bugs. The screen includes a laminate of two layers of commercially available light colored see-through screen material between which decorative images of dark colored screen material are sandwiched to create an aesthetically pleasing appearance for celebrating an occasion or event. The appearance can be changed as often as desired based on replacing the images that commensurate with the mood of the season, occasion, or event.

Preferably, the following steps are followed to form laminated panels of door/window screens. First, cardboard patterns of a desired design are cut out using decorative stencil images. The cardboard patterns are then used to cut out dark colored screen from a sheet of window/door screen material following the geometric designs of the stencil images. One of two identically sized and shaped light colored window/door screen sheets is horizontally placed on a flat surface. Removable, clear waterproof adhesive is applied to one side of the cut out dark image (images), and then the image (images) is strategically placed on the first flat sheet of screen, resting on a flat surface. The dark screen image is then lightly pressed against the light colored screen to secure the cut out image thereto. The same adhesive is applied on the exposed surfaces of the dark cut out image, and a second matching light colored screen is placed and pressed against the first light colored screen to form the laminated composite panel with the image residing therebetween. The screen sheet panel now bears the sandwiched dark images, which can be seen from both sides of the screen sheet panel. The panels are then used to mount into any opening, such as doors or windows. Such image bearing screens can be made to fit the moods of varying seasons, occasion, or event, and it involves very simple steps of removing and replacing the dark images from between the light colored screens with different designs without interfering with the function of the panel, that is, to allow air to pass therethrough.

Accordingly, it is an object of the present invention to offer door/window screens, which bears decorative images.

Another object of the present invention is to offer simultaneously an aesthetically pleasing appearance without compromising the air flow through the screen as well as the protection against the elements of the nature, such as the intrusion of the bugs and insects from the outside environments.

It is another object of the present invention to offer an image bearing screen in which the decorative images can be seen from both sides of the opening.

A further object of the present invention is to offer the flexibility and ease of changing the decorative images from between the laminations of the screens, which allows the user to change the aesthetic of the door/window screen panel to reflect the respective moods of a particular season, occasion, or event.

It is yet another object of the present invention to offer a decorative image bearing window/door screen shade which uses removable adhesive to easily replace the images with varying patterned and colored images.

DETAILED DESCRIPTION OF THE PREFERRED EMBODIMENT

A method of making a see-through laminated image bearing window/door screen shade according to the present invention will now be delineated in detail with reference to the accompanying drawings.

Figure 1A:
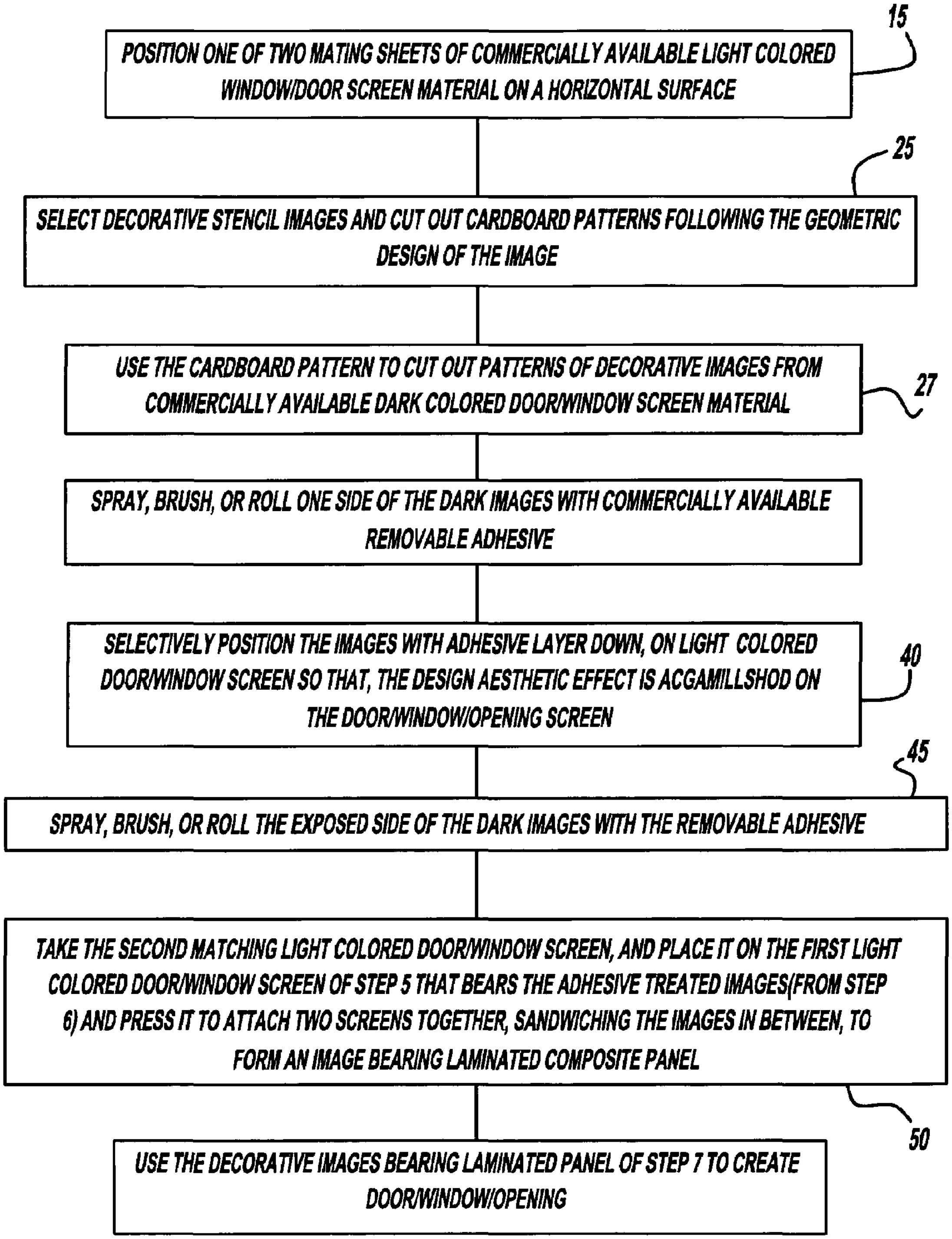
FIG. 1A is a flow chart outlining the steps of constructing each laminated composite panel.
Figure 5:
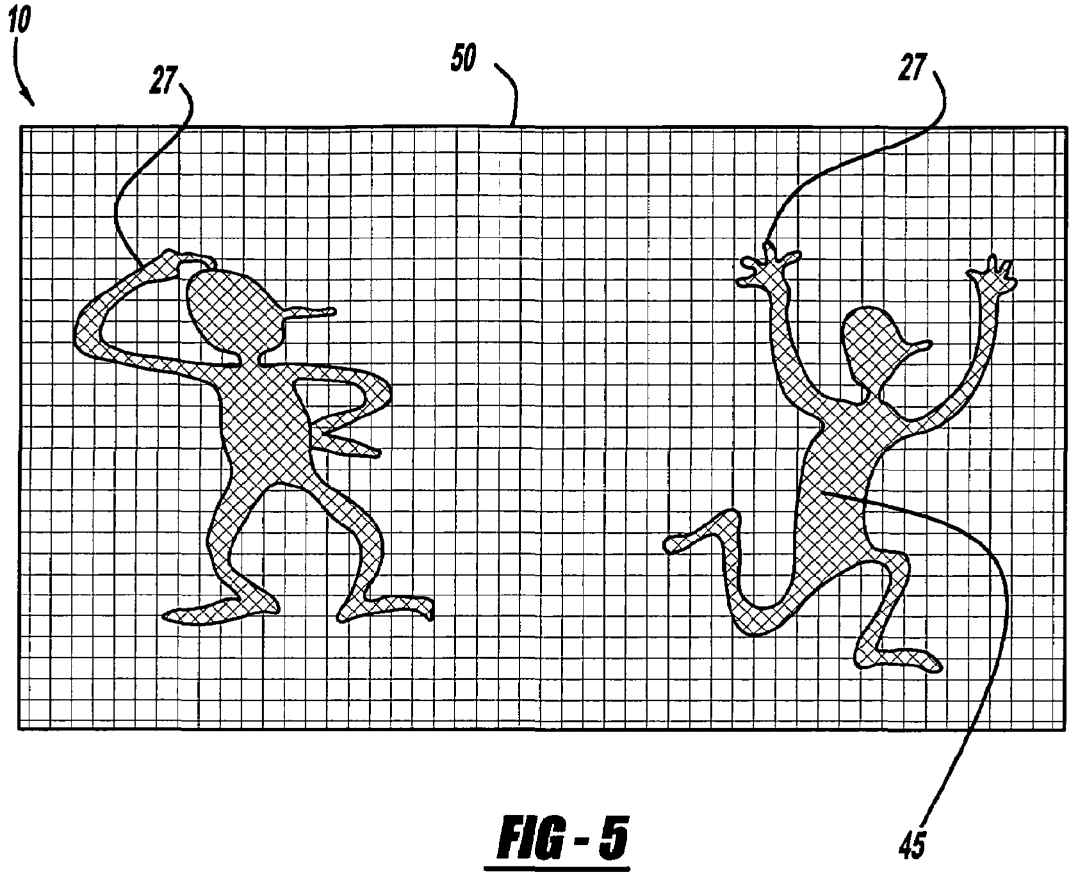
FIG. 5 is a plan view of the first screen with the decorative images attached to it.

Referring now to drawings, there will now be described a method of making a laminated decorative image bearing window/door screen panel 10 which can be used as a shade to protect against the elements of nature as well as offering an aesthetically pleasing appearance. FIG. 1A describes the steps to be followed to make such decorative laminated panel 10 in accordance with the present invention. The laminated composite decorative shade or panel is designated generally by reference 10 in FIG. 5. According to FIG. 1A, the first step is to select two sheets of similar sized light colored window/door screen material 12 and position one of two same sized sheets of commercially available light colored window/door screen material 12 on any convenient horizontal flat surface 15 (not shown). Thereafter, select decorative stencil images are cut out of a piece of cardboard 20 (not shown) to obtain the geometric design of the same images in cardboard format 25 (not shown). The cardboard images are used as a template to cut out identical decorative images 27 from a piece of dark colored commercially available window/door screen material 32. A layer of removable waterproof adhesive (not shown) is then applied to one side of the decorative images 27 of the dark colored window/screen material 32. Alternatively, the adhesive maybe sprayed, brushed or rolled onto the dark colored image 27, preferably an adhesive spray Krylon, an all-purpose No. 7011 is used. Next, each image 27 is selectively placed, with the adhesive facing down, onto the light colored window/door screen sheet 12 lying on the flat surface and light pressure is applied so that the image 27 adheres to the substrate 40. Next, the same adhesive is applied to the exposed or upper surface 45 of each image 27 before a second sheet of light colored see-through door/window screen 12 is placed and pressed against the first screen 12 to form the laminated composite panel 10 sandwiching the images 27 therebetween 50. The panel 10 thus constructed may then be mounted in a frame for a window or door opening so that the aesthetic decorative laminate composite 10 is visible to enjoy.

Figure 1B:
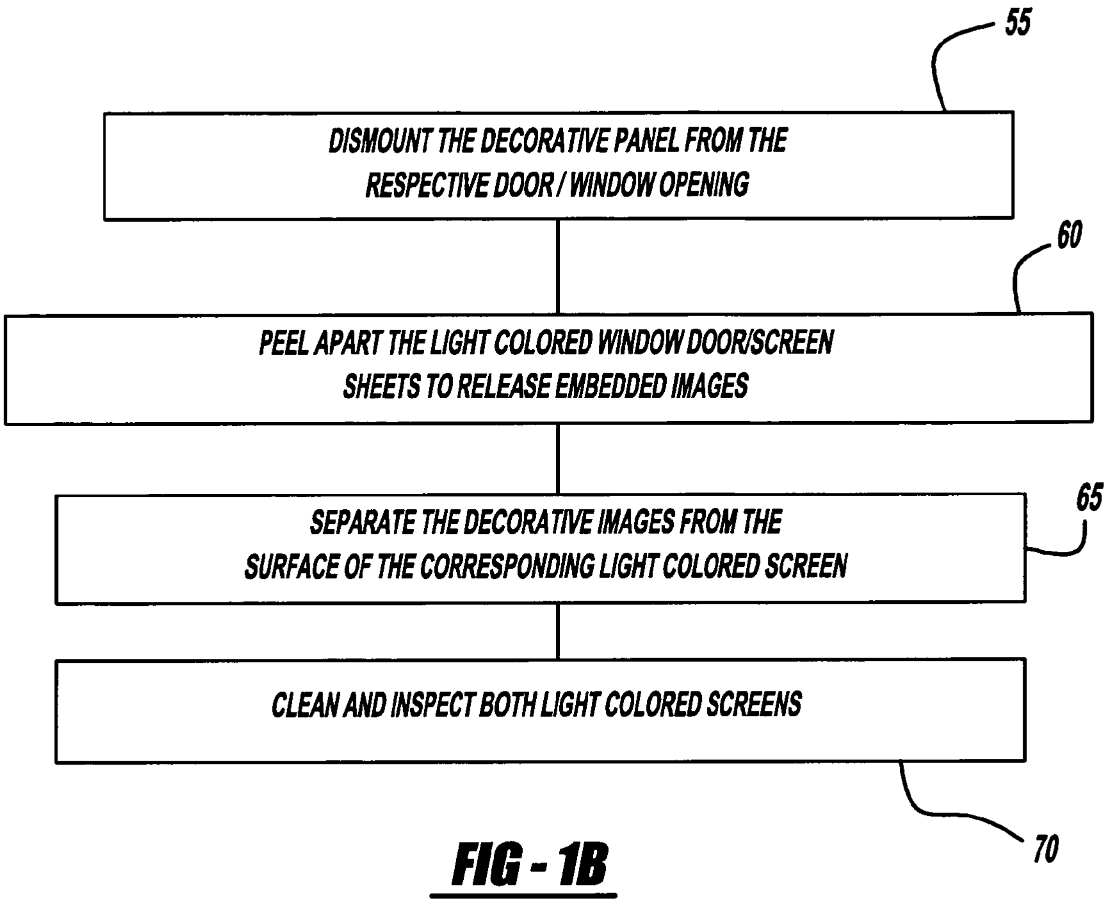
FIG. 1B is a flow chart outlining the steps of removal of decorative images from the laminated composite panel before new images are incorporated to construct a new panel with new decorative images.
Figure 2:
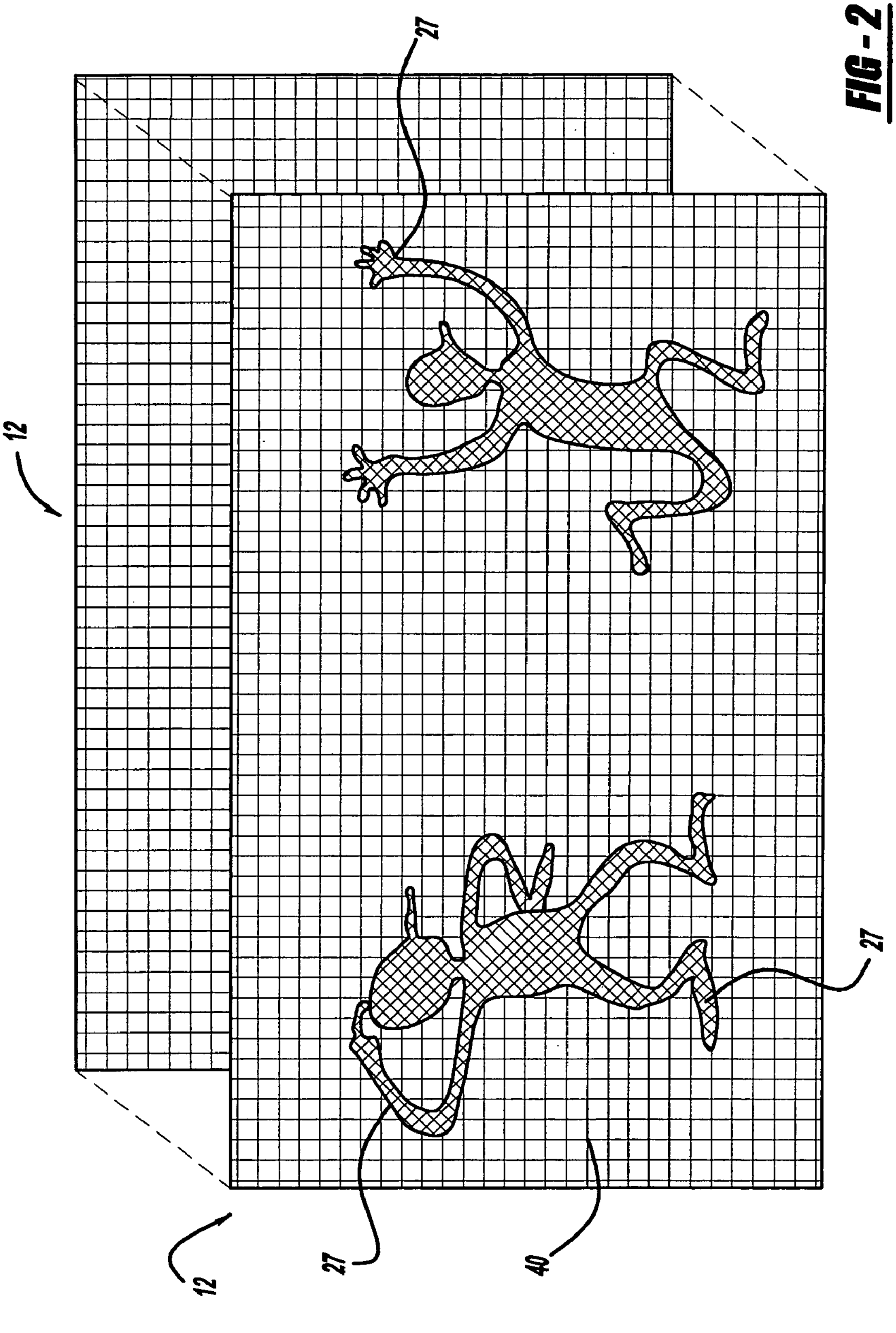
FIG. 2 is plan view of the laminated composite panel with the decorative images sandwiched therebetween.
Figure 3:
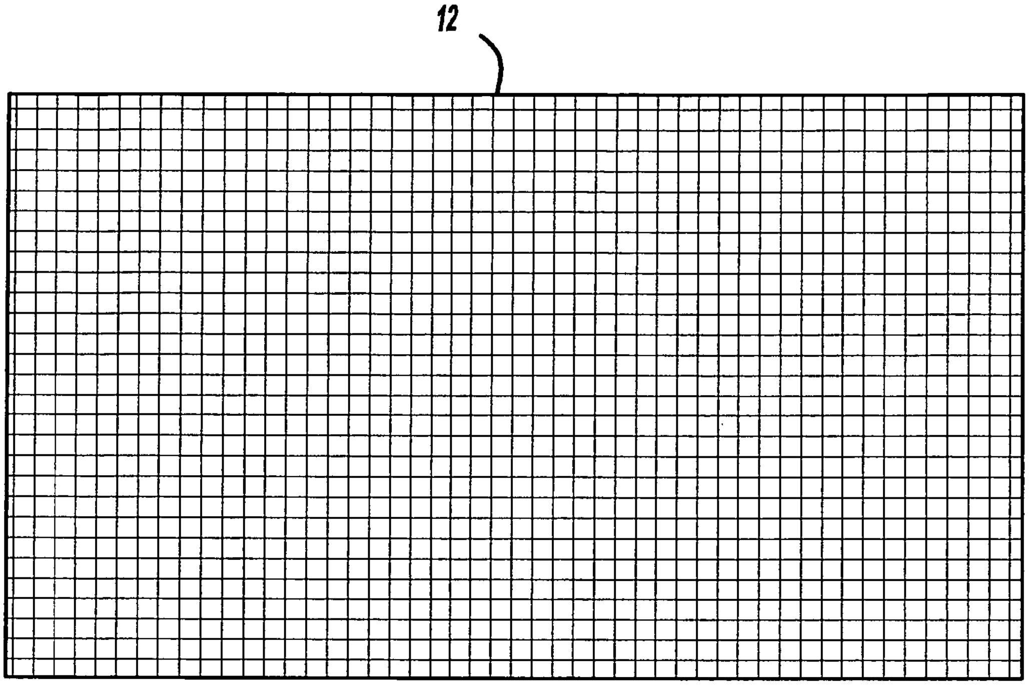
FIG. 3 is a plan view showing a light colored flat sheet of screen material.
Figure 4:
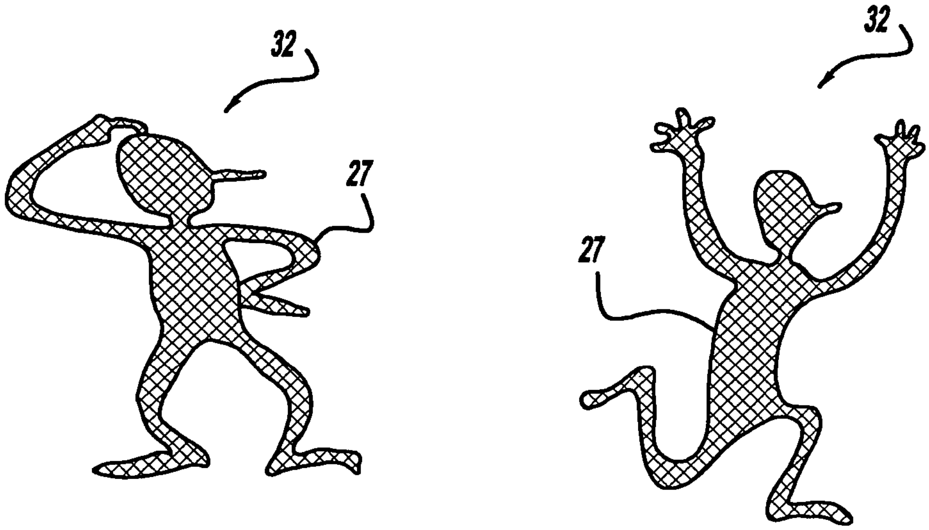
FIG. 4 is plan view of dark colored decorative images to be sandwiched between layers of light colored screen material.

Since the decorative images 27 are incorporated between two layers of light colored screen sheets 12 with removable waterproof adhesive; the present invention is capable of offering the option to construct new and different decorative laminated composite panels 10. The new composite panels 10 are constructed by removing and replacing the embedded decorative images 27 with variable decorative images 27 of different pattern/design by repeating steps 27 through 50 and using the same two sheets of light colored screens 12. In order to construct a different and new decorative laminated panel 10, first, the already embedded images 27 are easily removable from between the layers of light colored screen sheets 12 of the panel 10. FIG. 1B illustrates the steps to be followed to remove embedded decorative images 27 from the laminated composite panel 10 in accordance with the present invention. According to FIG. 1B, the first step is to dismount 55 the decorative panel 10 from the respective door/window opening. Next, the light colored screens 12 are separated 60, by peeling each one off from the other, to release the embedded images 27 from therebetween 50. Carefully, each decorative image 27 is then peeled off 65 from the surface of corresponding light colored screen 12. Both light colored screens 12 are then cleaned and inspected 70 to ascertain the suitability for further use to construct a new decorative laminated composite panel 10. A new set of decorative images 27 are then selected and prepared from dark colored window/door screen material 32 for a new laminated panel 10 following the steps 27 through 50 of FIG. 1A. Such a new panel 10 is then constructed by following the steps in accordance with FIG. 1A. Again, the panel 10 thus constructed may then be mounted in a frame for a window or door opening so that the aesthetic decorative laminated composite 10 is visible to enjoy. The lamination of the decorative images 27 to the light colored outer sheets of screen 12 have no effect on the function of the screen since the images 27 are also constructed of a screen material 32 and therefore pose no obstruction to the air flow through the assembled composite panel 10.

What is claimed is:

1. A method of making changeable image bearing laminated composite panel for using as a window/door/opening shade so as to offer an aesthetically pleasing appearance which can be seen from either side, in which the method comprises the steps of:

horizontally positioning a first sheet of light colored door/window screen material on a flat surface;

cutting out decorative images from a dark colored door/window screen material, placing and attaching said images on said first sheet of light colored window/door screen; and placing and attaching a second sheet of said light colored door/window screen material to said first sheet of door/window screen, sandwiching said images therebetween, whereby said laminated image bearing window/door shade is constructed.

2. The method according to claim 1 wherein, said decorative images are selected from commercially available or user made decorative stencil images.

3. The method of claim 2 wherein, said decorative stencil images are used to cut out cardboard patterns.

4. The method according to claim 1 wherein, said decorative images are cut out from said dark colored window/door screen material using said cardboard patterns.

5. The method according to claim 1 wherein, said decorative images are of contrasting colors with said light colored screens.

6. The method according to claim 1 wherein, said light colored window/door screen material is commercially available screen material of any available light color and grade.

7. The method according to claim 1 wherein, said decorative images are attached to said screens using removable waterproof adhesives.

8. The method according to claim 1 wherein, said decorative images are replaceable by images of varying colors, sizes, and shapes.

9. A method of removal of embedded decorative images from an image bearing laminated composite panel made of two layers of light colored window/door screens, having dark colored decorative images embedded and attached with removable waterproof adhesive to offer a new and different aesthetically pleasing appearance, in which the method comprises the steps of:

separating a first layer of said light colored screen from a second layer of said light colored screen of said composite panel by peeling each layer off from the other;

peeling off said decorative images from respective layer of said light colored window/door screens; and cleaning and inspecting each of said light colored screens whereby, said screens can be used to incorporate new said decorative images to form a new aesthetically pleasing said composite panel for door/window shade.

* * * * *